Dec. 30, 1958  B. R. VAN SLYCK ET AL  2,866,549
FRUIT PROCESSING MACHINE
Filed June 10, 1953  2 Sheets-Sheet 1
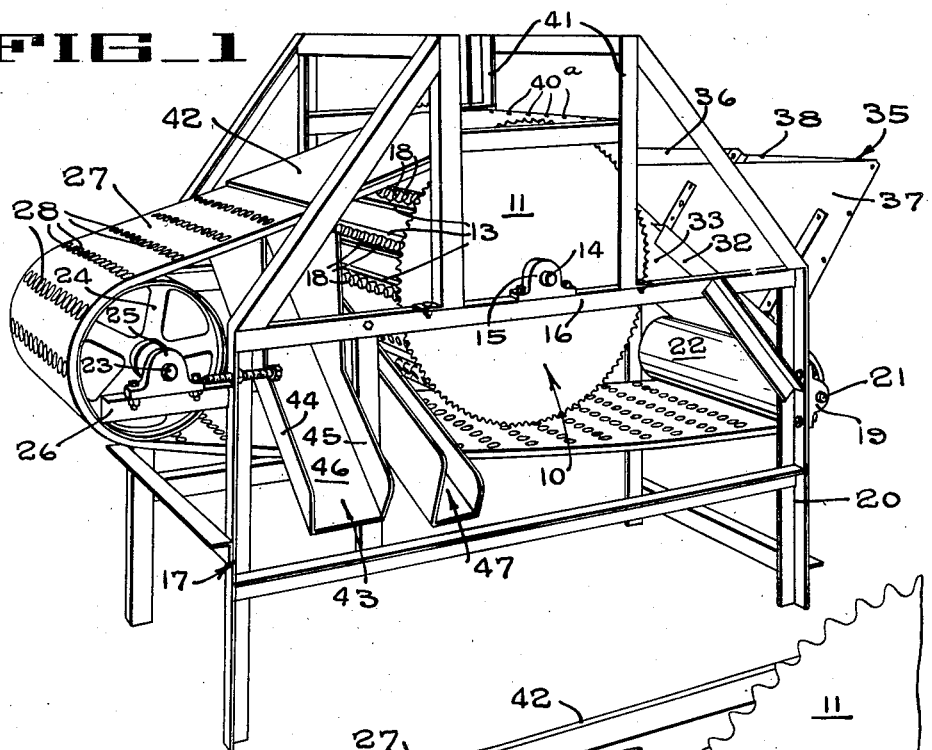
FIG_1
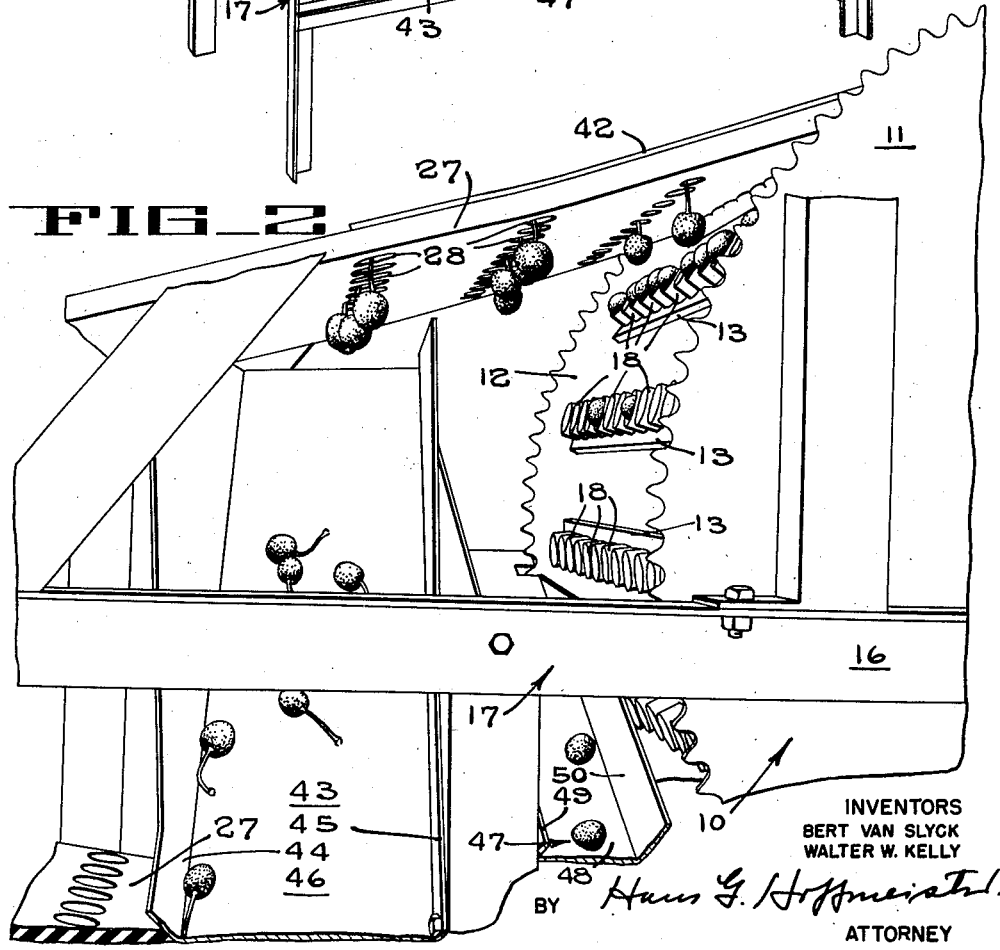
FIG_2
INVENTORS
BERT VAN SLYCK
WALTER W. KELLY
BY Hans G. Hoffmeister
ATTORNEY Dec. 30, 1958     B. R. VAN SLYCK ET AL     2,866,549
FRUIT PROCESSING MACHINE
Filed June 10, 1953     2 Sheets-Sheet 2
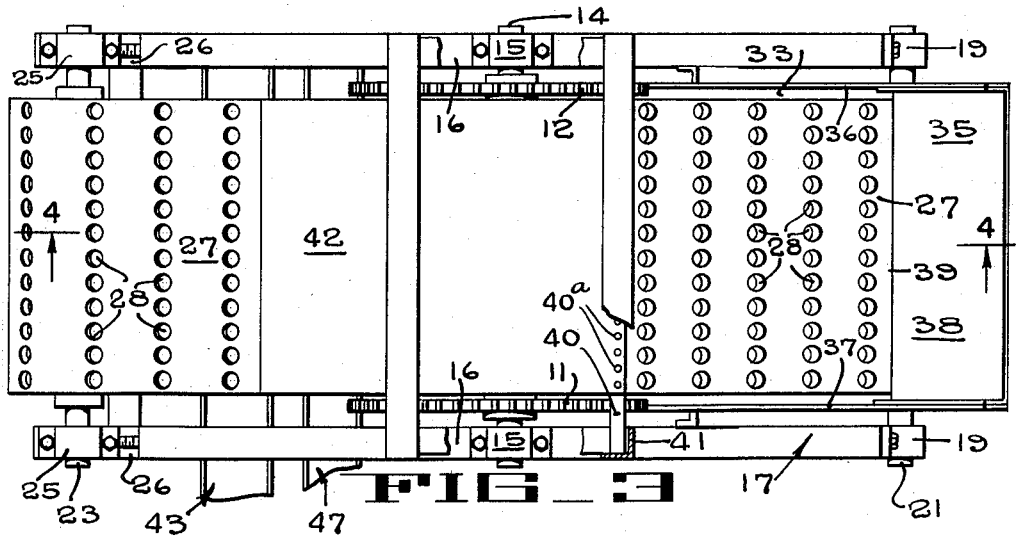
FIG_3
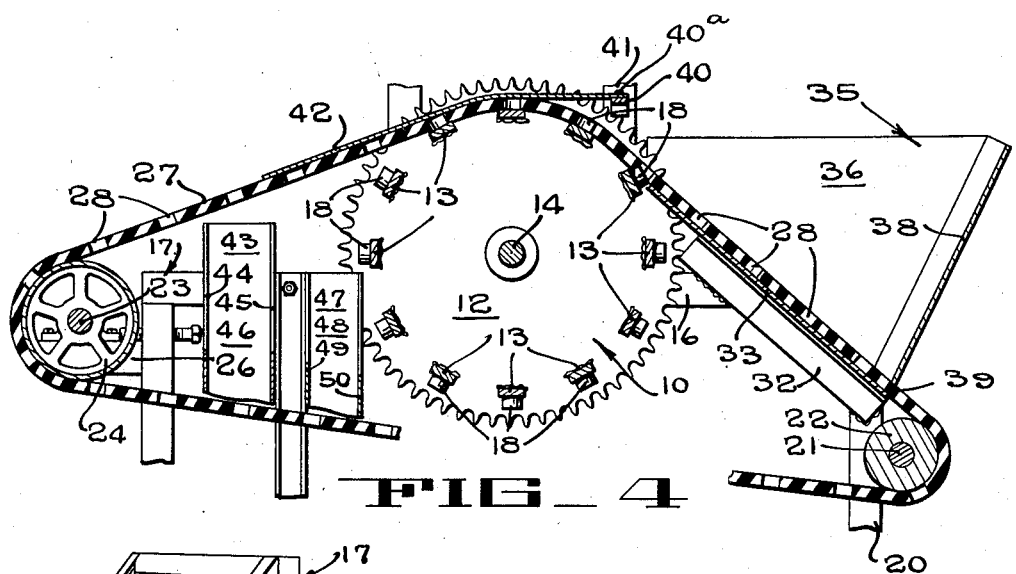
FIG_4
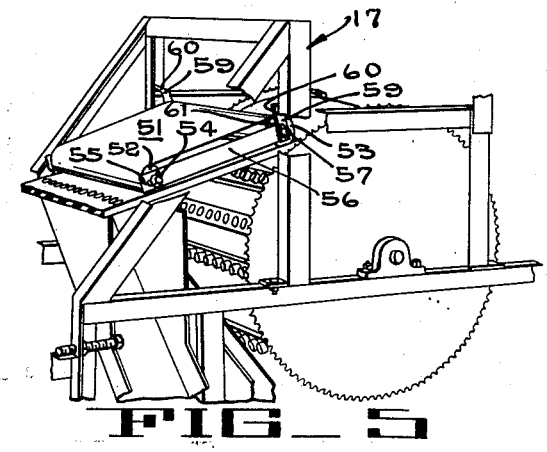
FIG_5
INVENTORS
BERT VAN SLYCK
WALTER W. KELLY
BY Hans G. Hoffmeister
ATTORNEY

United States Patent Office 2,866,549
Patented Dec. 30, 1958

2,866,549

FRUIT PROCESSING MACHINE

Bert Randall Van Slyck and Walter W. Kelly, Portland, Oreg., assignors to Food Machinery and Chemical Corporation, San Jose, Calif., a corporation of Delaware Application June 10, 1953, Serial No. 360,804

9 Claims. (Cl. 209—108)

The present invention appertains to fruit processing machines and more particularly it relates to an improved cherry separating machine.

In the cherry processing industry it is often desirable to separate stemmed cherries (cherries having stems) from destemmed cherries (cherries without stems) since there is a market demand for each type.

One object of the present invention is to provide a machine to which both stemmed and destemmed cherries may be fed in batches which will separate the stemmed cherries from the destemmed cherries.

Another object is to provide a cherry separating machine which is fully automatic in its operation and which eliminates all hand work in separating stemmed cherries from destemmed cherries.

Another object is to provide a cherry separating machine which is simple in its operation and construction and which is relatively inexpensive in both initial cost and in upkeep.

Other objects and advantages of the present invention will become apparent from the following description and drawings, in which:

Fig. 1 is a perspective view of a preferred embodiment of the invention.

Fig. 2 is a perspective view of a portion of the apparatus shown in Fig. 1.

Fig. 3 is a plan view, certain portions of the frame being broken away or omitted.

Fig. 4 is a vertical section taken along lines 4—4 of Fig. 3.

Fig. 5 is a perspective view of a portion of a modified form of the machine shown in Fig. 1, certain parts being broken away.

The mechanism of the present invention includes a rotatable drum-like member 10 (Fig. 1) which comprises discs 11 and 12 (Fig. 2) spaced apart by and fixed to a plurality of bars 13. A shaft 14 (Fig. 1) extends centrally through the discs 11 and 12 and is welded thereto. Each end of the shaft 14 (Fig. 3) is journaled in a bearing 15 secured to a horizontal support member 16 which forms a portion of a supporting frame 17 of the machine.

The bars 13 (Fig. 4) are spaced equi-distantly from each other around the periphery of the drum 10. Each bar 13 (Fig. 2) is provided wtih a plurality of cherry receiving cups 18 affixed thereto in equally spaced relation, and each of the cups 18 are arranged to extend radially outwardly from the outer surface of the bar. In the present embodiment of the invention twelve cups 18 are mounted on each bar 13, however, any desirable number of such cups may be employed. Each of the cups 18 is of sufficient diameter to loosely receive a single cherry therein.

A pair of bearings 19 (Fig. 3), mounted at the rear of the frame 17 (Fig. 1) on spaced structural members 20, are provided to rotatably receive each end of an axle 21 of a guide roller 22. At the forward end of the frame 17, an axle 23 of a second guide roller 24 is journaled in bearings 25 (Fig. 3) which are mounted on spaced frame members 26.

Trained around the guide rollers 22 and 24 (Fig. 1) and around the drum 10 is an endless belt 27 provided with a plurality of holes 28, arranged in rows. Each hole 28 is of a size sufficient to receive a cup 18 therewithin, for driving the belt 27 from the drum 10, as will be explained hereinafter. Twelve such holes 28 are provided in each row, each hole 28 being arranged to register with a cup 18 on the bar 13, and the rows are spaced apart a distance equal to the distance between adjacent rows of cups 18.

The drum 10 is driven in a counter-clockwise direction, as viewed in Fig. 1, in any convenient manner, and, since the cups 18 are adapted to enter the holes 28, in driving engagement therewith, the belt 27 is driven in a counter-clockwise direction by the counter-clockwise rotation of the drum 10.

Secured to spaced inclined frame members 32 (Fig. 4) of the frame 17, and extending between the roller 22 and the drum 10, is a support plate 33. The upper surface of the plate 33 lies in a plane tangent to both the roller 22 and the drum 10 and is close beneath that portion of the belt 27 which extends between the roller 22 and the drum 10. The width of the plate 33 (Fig. 3) is such that it projects a short distance on either side of the belt 27.

The support plate 33 (Figs. 3 and 4) also serves as the forward wall of a cherry supply hopper 35. Secured to either side of said plate 33 (Fig. 3) are triangular plates 36 and 37 which serve as the sides of the hopper 35. Another plate 38, welded to and extending between the side members 36 and 37, serves as the back wall of the hopper 35. The lower edge of the back wall 38 (Fig. 4) is spaced a short distance above the lower edge of the forward wall 33 of the hopper 35 to provide a narrow gap 39, extending transversely between the side members 36 and 37, through which the belt 27 may freely pass, and as the drum 10 is rotated, the belt 27 is moved upwardly through the gap 39, through the hopper 35, over the support plate 33, and around the drum 10.

Extending transversely of the drum 10 (Figs. 3 and 4) and located a short distance thereabove is a bar 40 which is welded to spaced vertical frame members 41. Secured to the bar 40 by screws 40a is a flap 42 which drags on the belt 27 as the belt is advanced thereunder. The flap 42, made of rubber, canvas or other suitable material is adapted to engage and rest on the belt 27 from a point slightly to the rear of the point where the belt 27 leaves the drum 10 to a point somewhere intermediately of the drum 10 and the roller 24, substantially as shown in Fig. 4.

Positioned immediately below the upper reach of the belt 27 (Fig. 2) and spanning a short distance on either side of the loose end of the flap 42 is a chute 43 comprising sides 44 and 45 and a bottom 46. The chute 43 is supported by and welded to the frame 17 and it may empty into a storage bin for stem bearing cherries (not shown). Another chute 47, also welded to the frame 17, is positioned between the chute 43 and the drum 10 and comprises a bottom portion 48 and sides 49 and 50. The chute 47 may empty into a storage bin for destemmed cherries (not shown).

Cherries to be separated are placed in the hopper 35 and the driving means are actuated to rotate the drum 10, and thus drive the belt 27, in a counterclockwise direction (Fig. 1). As the belt 27 is moved upwardly through the hopper 35 both stemmed and destemmed cherries will drop into the holes 28, one in each said hole, and will rest on the support plate 33. The cherries which have dropped into the holes 28 are carried by the belt 27 upwardly, out of the hopper 35 and over the drum 10, at which time these cherries will drop into the cups 18 as each said cup meshes with its corresponding hole 28. It should be noted that the stems of the stem-bearing cherries that are picked up in the holes 28 of the belt 27 will always be directed outwardly from the belt 27 since the cherries that seek to enter the holes stem-end downwardly cannot drop into the holes deeply enough to be engaged or held by the belt 27 and they will roll back into the hopper 35.

The cups 18 are shallow enough to allow most of the stem of the stem-bearing cherries to protrude above the belt 27. As the drum 10 is further rotated, the protruding stems are carried under the flap 42 and are bent rearwardly over the upper edge of the respective holes 28. Thus, as the belt 27 leaves the drum 10 (Fig. 2) the stem-bearing cherries are carried with the belt 27 out of the cups 18 due to the frictional resistance to the passage of the stems through the holes 28 caused by the weight of the flap 42 on the protruding stems. The stemmed or stem bearing cherries will therefore be advanced with the belt 27 until their stems are carried clear of the flap 42, at which time the stems of these cherries are freed and said cherries will drop into the chute 43. The destemmed cherries will remain in the cups 18 until the rotation of the drum tips said cups sufficiently to allow the cherries to roll out of the cups 18 and into the chute 47. Thus, stemmed cherries may be taken from the chute 43 and destemmed cherries from the chute 47.

In the modified form of the invention shown in Fig. 5 the flap has been replaced by an endless belt 51 which is trained about rollers 52 and 53.

Each end of an axle 54 of the forward roller 52 is journaled in an aperture 55 provided in the forward portion of an arm 56. The axle 54 is maintained between the arms 56 by the usual washers and cotter pins. Similarly, each end of an axle 57 of the rear pulley 53 is journaled in an aperture, not shown, in the rear portion of the arms 56. Each of the downwardly extending arms 59 of a pair of brackets 60 have an elongated slot 61 therein which is adapted to rotatably receive that portion of the rear axle 57 which protrudes beyond each arm 56. The brackets 60 are welded to the frame 17, and the rear axle 57 is maintained in position, between said brackets, by cotter pins and washers, as shown.

The belt 51 is thus free to ride on the main belt 27, and it is frictionally driven thereby in a clockwise direction. Since the belt 51 serves the same function, in much the same manner, as the flap 42, the description of operation of the device need not be repeated. It should be noted however, that the flap 42 has a tendency to pull the stems from the stemmed cherries as they are advanced thereunder due to the drag of the flap on the stems. The belt 51, however, does not have such a tendency since it advances with the main belt and provides no drag on the stems but merely bends the protruding stems of the stemmed cherries to prevent their dropping free of the belt 27 until they are carried by said belt clear of the belt 51.

While we have illustrated and described two embodiments of the present invention, it will be understood, however that various other changes and modifications may be made in the details thereof without departing from the spirit and scope of the invention as set forth in the appended claims.

Having thus described our invention, what we claim as new and desire to protect by Letters Patent is:

1. A machine for separating stemmed cherries from destemmed cherries comprising a belt which has a plurality of cherry receiving holes extending therethrough, means adapted to back up a portion of said belt to prevent cherries in said holes from dropping through said belt while said cherries rest on said backing means, means for moving said belt over said backing means, and a flexible member resting on the belt for maintaining the stemmed cherries in said holes when said stemmed cherries have been moved by the belt beyond said backing means.

2. A cherry separating machine comprising a belt having a plurality of holes adapted to receive cherries therein, a hopper for receiving cherries to be separated, means for moving said belt through said hopper so that cherries in said hopper will drop into the holes in said belt as said belt is moved therethrough, means for backing up a portion of said belt to prevent cherries in said holes from dropping through said belt while such cherries are over said backing means, and holding means adapted to yieldably ride on said belt from a point over said backing means to a point forwardly thereof in the direction said belt is driven, said holding means being adapted to bend the protruding stems of stemmed cherries within said holes over the edges of said holes to thereby prevent said stemmed cherries from dropping free of the belt until the stems thereof are moved by said belt clear of said holding means.

3. A cherry separating machine comprising a rotatable drum having a plurality of cherry receiving cups, said cups being arranged in axially extending rows spaced equidistant from each other about the periphery of said drum, a forward pulley disposed with its axis parallel to the axis of the drum and in front of said drum, a rear pulley disposed with its axis parallel to the axis of the drum and behind said drum, a hopper having a wall which extends between and which lies in a plane tangent to said drum and said rear pulley, said hopper having a gap near the bottom thereof, an endless belt provided with a plurality of cherry receiving holes, said holes being aligned in rows transversely of said belt with each row being spaced equidistant from the adjacent row along the entire length of said belt, said rows of holes being spaced from each other a distance equal to the distance between adjacent rows of cherry receiving cups, said belt being trained about said forward pulley, about said rear pulley, through said gap provided therefor in the bottom of said hopper, upwardly through said hopper and about said drum, means driving said belt and said drum in such a way that the belt will be moved upwardly through said hopper and over said drum, the cups on said drum being arranged to coincide with the holes in said belt as said drum is rotated and the belt advanced, a flap fixed at one end in such a way that said flap will slide on said belt from the forward point of tangency of said belt and said drum to a point intermediately of said drum and the forward pulley, means for receiving the stemmed cherries carried by said belt to the loose end of said flap, and means for receiving destemmed cherries from the cherry receiving cups when said cups are tilted sufficiently by the rotation of the drum to allow such cherries to roll out of said cups.

4. A cherry separating machine comprising a belt having a plurality of holes adapted to receive individual cherries therein, a hopper for receiving and distributing cherries to be separated, means for moving said belt through said hopper adjacent its bottom so that cherries in said hopper will drop into and remain in the holes in said belt as said belt is moved therethrough, and a second belt engaging said apertured belt in driven relationship therewith, said second belt being adapted to press the protruding stems of the stemmed cherries against the upper surface of said apertured belt to thereby prevent only the stemmed cherries from dropping through said holes at a first point and adapted to release the stems of the stemmed cherries at a second point spaced from said first point to permit the stemmed cherries to drop through said holes at said second point.

5. A machine for separating stemmed cherries from destemmed cherries comprising a plurality of cherry receiving cups, means supporting said cups and adapted to move them in an endless path, a conveyor belt having a plurality of cherry receiving holes, said belt being trained about said cup supporting means, said cups being arranged to mesh with said belt and extend into said holes, means for moving said belt and said cups in unison to thereby move said cups into and out of mesh with said belt, means for supplying cherries to be separated to said holes, said cups and said holes being so arranged that cherries in said holes will drop into said cups when said cups mesh with said belt, said cups being of a depth to allow the stems of stemmed cherries to protrude above the belt while said cherries are in said cups, and an endless belt adapted to rest on a portion of said conveyor belt and to be driven thereby, said endless belt being arranged to engage the protruding stems of stemmed cherries and to bend them over the edges of the holes in said conveyor belt so that the stemmed cherries will be carried by said conveyor belt out of their respective cherry receiving cups when said cups are moved out of mesh with said belt and to release said stemmed cherries when they have been carried beyond said cups to permit said stemmed cherries to drop through said holes thereby separating the stemmed from the destemmed cherries.

6. A machine for separating stemmed cherries from destemmed cherries comprising a conveyor which has a plurality of cherry receiving chambers extending therethrough, means adapted to back up a portion of said conveyor to prevent cherries in said chambers from dropping through said conveyor while the cherries rest on said backing means, means for moving said conveyor over said backing means, and a flexible member resting on said conveyor for contacting the stems of the stemmed cherries and confining said stems between said stem contacting means and said conveyor for retaining the stemmed cherries in said chambers while said chambers are moved beyond said backing means.

7. A machine for separating stemmed cherries from destemmed cherries comprising a conveyor which has a plurality of cherry receiving chambers extending therethrough, a flat plate backing up a portion of said conveyor to prevent cherries in said chambers from dropping through said conveyor, a drum rotatably mounted substantially in tangential relation with the forward edge of said plate, a plurality of cherry receiving cups on said drum adapted to enter the cherry receiving chambers of said conveyor and support the cherries therein as said chambers leave said plate, means for moving said conveyor and said drum in timed relation with each other, and a flexible member resting on said conveyor for contacting the stems of the stemmed cherries and confining said stems between said stem contacting means and said conveyor for retaining the stemmed cherries in said chambers while said chambers are moved beyond said drum.

8. A machine for separating stemmed cherries from destemmed cherries comprising an apertured belt provided with a plurality of cherry receiving holes, backing means disposed below a portion of said belt and arranged to support stemmed and destemmed cherries positioned in the holes thereabove with the stems of stemmed cherries protruding upwardly through said holes, means for moving said belt relative to said backing means, an endless belt floatingly mounted adjacent said apertured belt and arranged to bend over the protruding stems of cherries supported on said backing means and press the stems against said apertured belt whereby the stems of the stemmed cherries are locked between the apertured belt and the endless belt to support the cherries while they are moved by said belts away from said backing means to a predetermined point of release, first collecting means disposed below said apertured belt at said predetermined point in position to receive said stemmed cherries as the stems are released by said endless belt, means for moving said backing means to an inclined position to discharge destemmed cherries, and second collecting means disposed adjacent said backing means in position to receive the destemmed cherries as they are discharged.

9. A machine for separating stemmed cherries from destemmed cherries comprising an apertured belt provided with a plurality of cherry receiving holes, backing means disposed below a portion of said belt and arranged to support cherries positioned in the holes thereabove with the stems of stemmed cherries protruding upwardly through said holes, means for moving said belt over said backing means, and a flexible flap anchored at one end adjacent said belt and having a portion arranged to rest on the belt from a point above said backing means to a point disposed downstream of said backing means to contact the upwardly protruding stems of stemmed cherries in said holes and bend the stems over against said belt to grip the stems between said flap and said belt and convey the stemmed cherries away from said backing means.

References Cited in the file of this patent

UNITED STATES PATENTS

| 1,097,439 | Jaquette | May 19, 1914 |
| 2,308,190 | Magnuson | Jan. 12, 1943 |
| 2,361,834 | Frova | Oct. 31, 1944 |
| 2,462,682 | Schubert | Feb. 22, 1949 |
| 2,649,960 | Gammeter | Aug. 25, 1953 |
| 2,668,619 | Wormser et al. | Feb. 9, 1954 |
| 2,693,834 | Frova | Nov. 9, 1954 |
| 2,713,944 | Schubert | July 26, 1955 |
| 2,714,411 | Aguilar et al. | Aug. 2, 1955 |

FOREIGN PATENTS

| 1,022,190 | France | Dec. 10, 1952 |